United States Patent
Chu et al.

(10) Patent No.: US 6,801,961 B2
(45) Date of Patent: Oct. 5, 2004

(54) METHOD FOR SOLVING INTERMISSION OF STREAMING DATA AND ASSOCIATED DEVICE THEREOF

(75) Inventors: Chia-Chin Chu, Taipei (TW); Yung-Huei Chen, Taipei (TW)

(73) Assignee: VIA Technologies, Inc., Hsin-Tien (TW)

( * ) Notice: Subject to any disclaimer, the term of this patent is extended or adjusted under 35 U.S.C. 154(b) by 766 days.

(21) Appl. No.: 09/779,601

(22) Filed: Feb. 9, 2001

(65) Prior Publication Data

US 2001/0014130 A1 Aug. 16, 2001

(30) Foreign Application Priority Data

Feb. 11, 2000 (TW) ........................................ 89102364 A

(51) Int. Cl.[7] .............................................. G06F 13/00
(52) U.S. Cl. ........................... 710/33; 710/31; 710/107; 712/225; 709/201
(58) Field of Search ................................ 710/1, 31, 33, 710/34, 38, 36, 74, 107; 712/225, 235; 709/201, 305; 711/152

(56) References Cited

U.S. PATENT DOCUMENTS

| | | | | |
|---|---|---|---|---|
| 6,021,407 A | * | 2/2000 | Meck et al. | .................... 707/7 |
| 6,084,739 A | * | 7/2000 | Assouad | .................. 360/77.08 |
| 6,415,244 B1 | * | 7/2002 | Dickens et al. | ............. 702/187 |
| 6,421,498 B1 | * | 7/2002 | Fukuoka et al. | .............. 386/53 |

* cited by examiner

Primary Examiner—Jeffrey Gaffin
Assistant Examiner—Riuk Jue Mai
(74) Attorney, Agent, or Firm—Rabin & Berdo, P.C.

(57) ABSTRACT

A method for solving intermission of streaming data. A digital controller is used to transmit streaming data stored in a storage unit. The digital controller includes a base recording unit and a trigger recorder. The method comprises steps of (a) writing an initial address of a streaming data to the base recording unit when the streaming data is being transmitted; (b) changing a content value of the trigger recorder, and proceeding to the step (a) and a step (c) simultaneously; (c) transmitting a corresponding streaming data according to one of the initial address(es) stored in the base recording unit by the digital controller; and (d) proceeding to the step (c) when the trigger recorder indicates that there are data remained to be transmitted.

15 Claims, 6 Drawing Sheets

METHOD FOR SOLVING INTERMISSION OF STREAMING DATA AND ASSOCIATED DEVICE THEREOF

This application incorporates by reference Taiwanese application Serial No. 89102364, Filed Feb. 11, 2000.

BACKGROUND OF THE INVENTION

1. Field of the Invention

The present invention relates to a method and device for solving intermission of streaming data. More particularly, the present invention relates to a method and device for solving intermission of isochronous streaming data in a computer system.

2. Description of Related Art

Computers in this multimedia era are required to transmit various forms of data which include text, audio, and video data. Various forms of data have different requirements for transmission. Text data only require to be transmitted correctly but transmitting in real time is not important. On the other hand, audio and video signals, also called isochronous streaming data, due to the sensitivity of human hearing, has to be transmitted in real time to avoid intermitting the streaming signal.

FIG. 1 depicts a conventional block diagram for data transfer in a computer. Audio data transfer, for example, is controlled by a driver. Initially, an application transfers a wave file stored in a hard disk 102 to a memory 104, in which data in the wave file, i.e. the wave data, is stored temporarily for further processing. The operation system then uses the driver to control a digital controller 106, and the digital controller 106 transfers the wave data stored in the memory 104 to a signal processor 108. The signal processors 108 finally output analog audio signals to a speaker 110 for sound play. The memory 104 can not only accept wave files stored in the hard disk 102, but also wave files from a network or an external audio source.

FIG. 2 depicts, in a flow chart, the conventional method in which streaming data is transmitted. Referring to FIGS. 1 and 2, in step 202, an operating system determines whether streaming data is transmitted. If there are streaming data being transmitted, then proceed to step 204, otherwise the procedure ends. In step 204, the operating system transfers the streaming data stored in the hard disk 102 into the memory 104. Next, in step 206, the driver initiates the digital controller 106 to transfer the streaming data stored in the memory 104 into the signal processor 108. Then, in step 208, the digital controller 106 determines whether the streaming data has been transmitted completely. If not, the transmission procedure returns to step 206 and continues the data transfer. On the other hand, if the transmission is deemed to be complete, then proceed to step 210 to send an interrupt to the driver to acknowledge the completion of the streaming data transmission, and then return to step 202.

The transmission procedure from the memory 104 to the signal processor 108 is further discussed below. At step 210, after the interrupt is sent to the digital controller 106 to signal the completion of the data transfer, the procedure returns to step 202. The digital controller 106 is again ready to read data. Meanwhile, intermission of streaming data may occur if the digital controller 106 does not transmit data to the signal processor 108. As a result, the audio signal cannot be real-time transmitted to the speakers 110 for playback, which yields "broken" and "choppy" audio sounds that diminishes the listening pleasure for the user.

Accordingly, there is existing an intermission period between that a first streaming data transmission is finished and that a second streaming data begins to be transmitted. For example, the time for completing respective audio streaming data requires about 10 ms, and 0.1 ms for the intermission period which is 1% of the time period of each data transmission. Therefore, noise occurs during playing sound.

Conventionally, a first in first out (FIFO) register provided within the digital controller 106 is used to alleviate the intermission of streaming data problem. The FIFO register is used to temporarily store data which the digital controller 106 sequentially read from the memory 104. The data in the FIFO register is then popped to the signal processor 108. In this way, the digital controller 106 can still pop the streaming data stored in the FIFO register to the signal processor 108 during the intermission period, as long as the size of the FIFO register is large enough. However, if the FIFO register size is not large enough or the intermission period is too long, the streaming data still do not appear in real time. Furthermore, lots of logic gates are required for the FIFO register in the hardware design of the digital controller 106.

SUMMARY OF THE INVENTION

It is an objective of the present invention to provide a method and device for solving intermission of streaming data. The present invention alters the algorithm of the driver and the hardware design of the digital controller to provide excellent results in playing audio or video data without interruption. As a result, not only is hardware space and cost minimized, but the system is much more stable.

According to the objective of the present invention, it provides a method for solving intermission of streaming data. A digital controller is used to transmit streaming data stored in a storage unit. The digital controller includes a base recording unit and a trigger recorder. The method comprising steps of: (a) writing an initial address of a streaming data to the base recording unit when the streaming data is being transmitted; (b) changing a content value of the trigger recorder, and proceeding to the step (a) and a step (c) simultaneously; (c) transmitting a corresponding streaming data according to one of the initial addresses stored in the base recording unit by the digital controller; and (d) proceeding to the step (c) when the trigger recorder indicates that there are data remained to be transmitted.

It is to be understood that both the foregoing general description and the following detailed description are exemplary, and are intended to provide further explanation of the invention as claimed.

BRIEF DESCRIPTION OF THE DRAWINGS

The accompanying drawings are included to provide further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
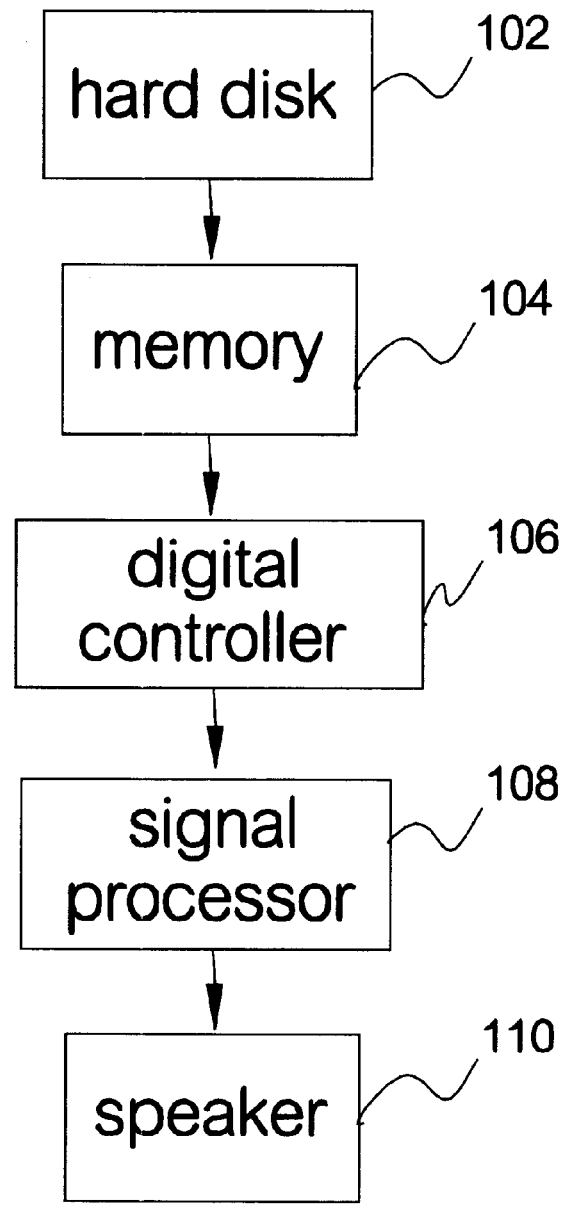
FIG. 1 shows a conventional block diagram used for transmitting streaming data in a computer.
Figure 2:
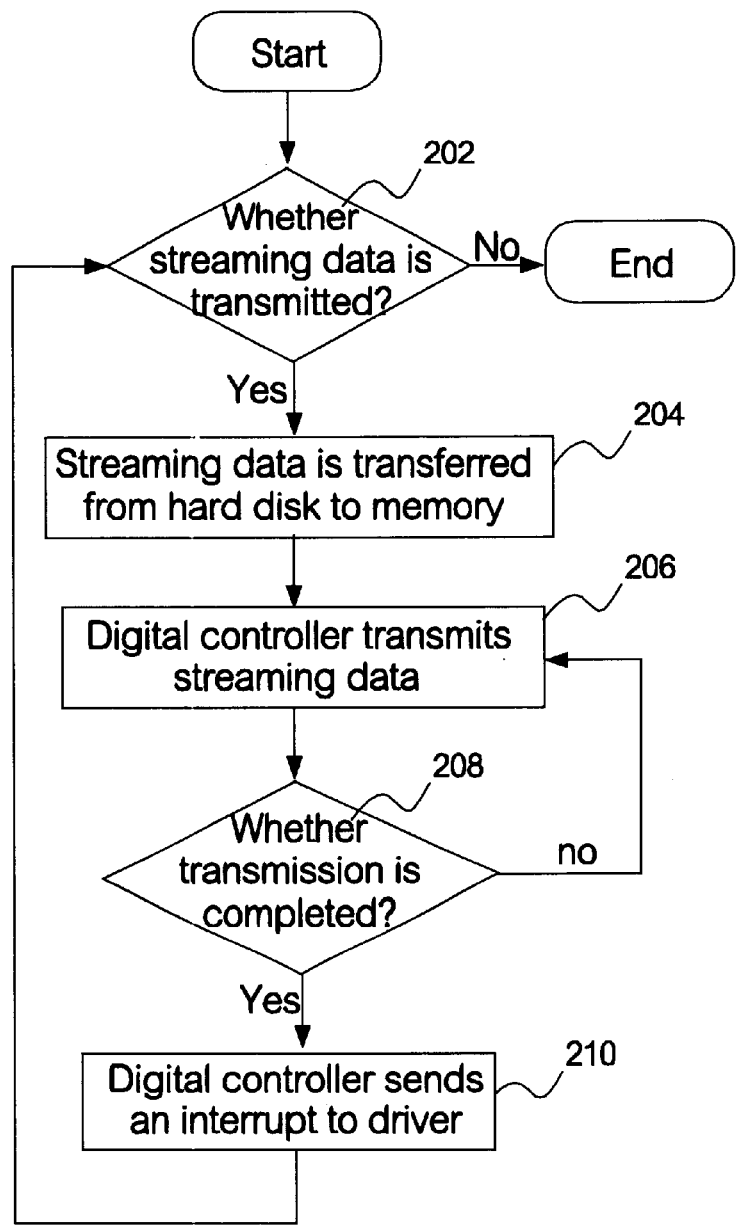
FIG. 2 shows a conventional flow-chart for transmitting streaming data.
Figure 3:
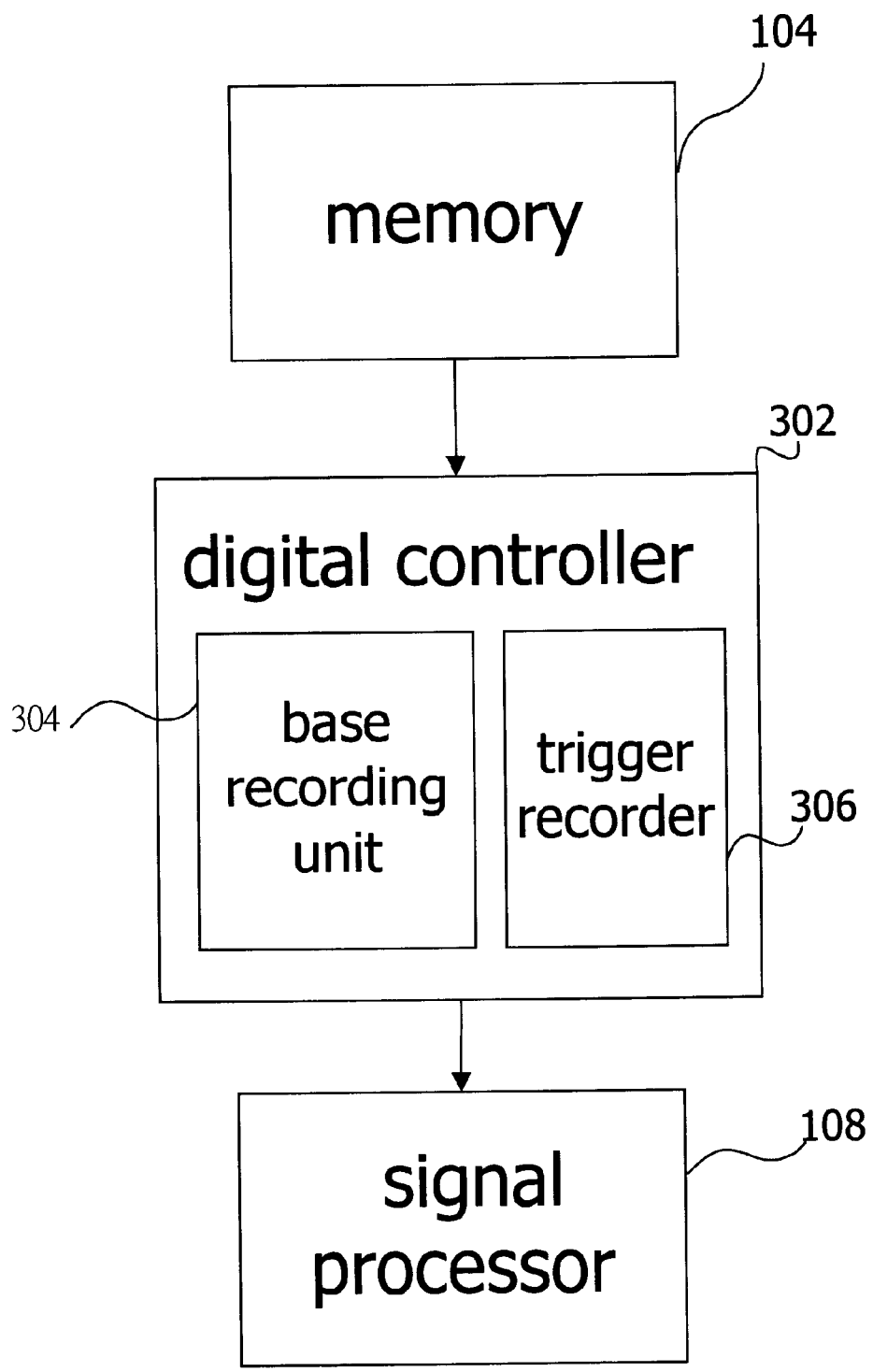
FIG. 3 shows a block diagram of a device for solving intermission of streaming data during transmission according to one preferred embodiment of the present invention.

FIG. 3 shows a block diagram of a device for solving intermission of streaming data during transmitting according to one preferred embodiment of the present invention. First, the base address of the streaming data to be transmitted (the start address of the first frame of streaming data) from the memory 104 to the signal processor 108 is written by the driver into the base recording unit 304 within the digital controller 302. The driver then triggers the digital controller 302 to initiate a streaming data transmission. Regardless of whether the transmission of the previous streaming data is completed or not, the driver can write a second streaming data into the memory 104, write its corresponding base address into the base recording unit 304, and trigger the digital controller 304.

If the digital controller 302 has completed the transmission of the first frame of streaming data and been triggered by the driver, the digital controller 302 will then read the contents of the base recording unit 304 and begin transmitting the second frame of streaming data. However, if the digital controller 302 does not complete the transmission of the first streaming data and the driver triggers the digital controller 302 again, the content of the trigger recorder 306 in the digital controller 302 will be changed. The digital controller 302 can detect this change and will initiate the transmission of the next frame of streaming data immediately following the completion of the current frame. Recording in turn for the triggering the digital controller 302 by the driver in the trigger recorder 306 is also termed "queuing".

The base recording unit 304 can either be a register for recording a memory address or a plurality of registers for recording M memory addresses. The driver sequentially writes the start addresses of data being transferred into the base recording unit 304.

The trigger recorder 306 can be a flip-flop which is triggered while the driver triggers the digital controller 302. The digital controller 302 can detect a change in the output level of the flip-flop to determine whether the driver triggered the digital controller 302.

In addition, the trigger recorder 306 can be a counter capable of counting up to an integer M. In this way, the trigger recorder 306 can record M triggers of the digital controller 302 by the driver. In the mean time, the base recording unit 304 should be also capable of recording M memory addresses.

Figure 4:
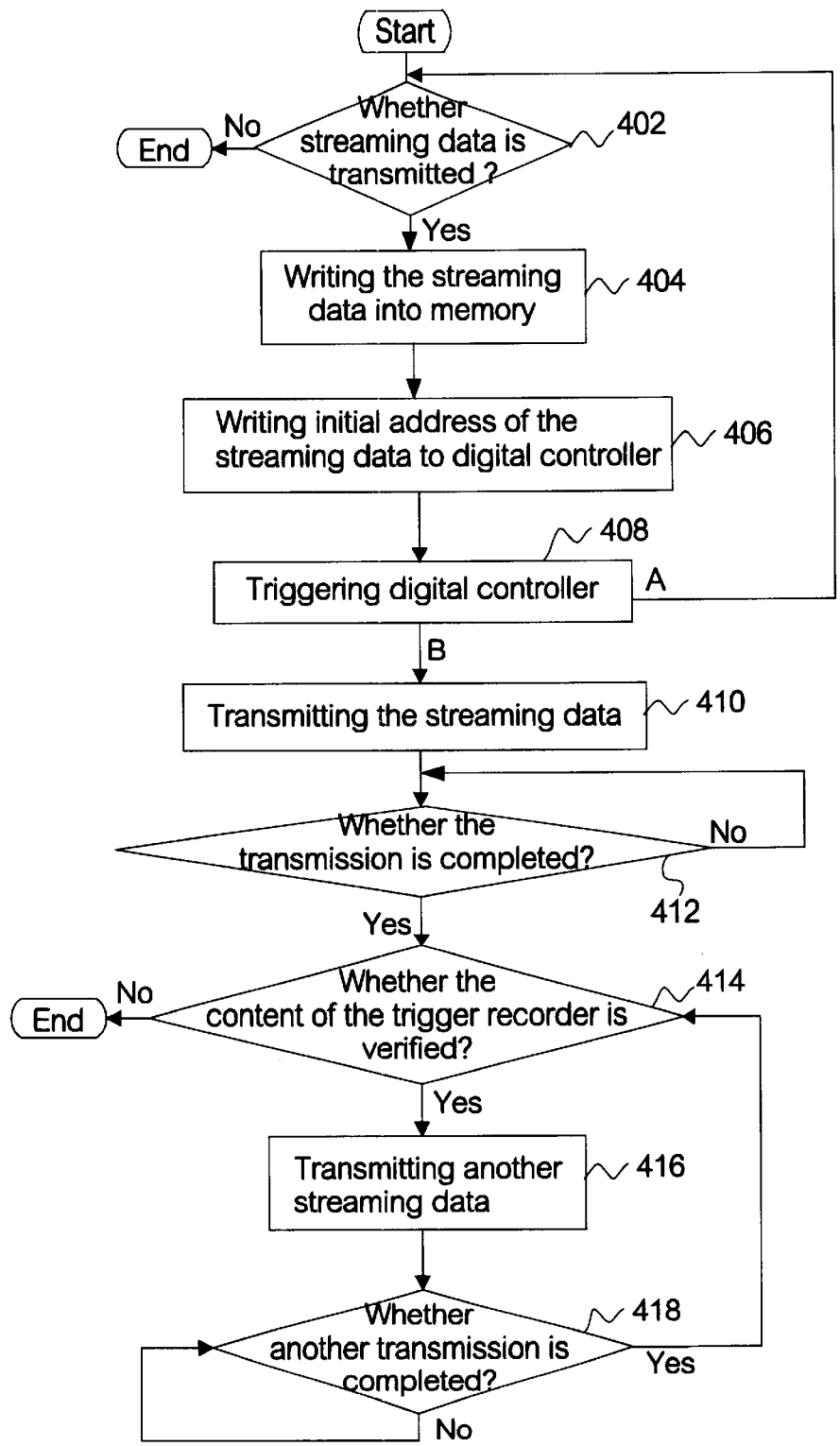
FIG. 4 shows a flow-chart of a method for solving intermission of streaming data during transmission according to one preferred embodiment of the present invention.

FIG. 4 shows a flow-chart of a method for solving intermission of streaming data during transmission according to one preferred embodiment of the present invention. First, in step 402, the driver determines whether a streaming data is going to be transmitted. If so, proceed to step 404 to write the streaming data into the memory 104 by the driver; otherwise, the procedure ends. Next, in step 406, the driver writes the initial address of the streaming data into the base recording unit 304 of the digital controller 302. After the driver, in step 408, triggers the digital controller 302, the flowchart proceeds to steps 402 and 410 simultaneously.

In step 410, the digital controller 302 begins to transmit the streaming data from memory 104, according to the base address stored in the base recording unit 304, to the signal processor 108. The digital controller 302, in step 412, then determines whether the streaming data has been completely transmitted. If so, then proceed to step 414; otherwise, the procedure returns to the step 412.

In step 414, determine whether the content of the trigger recorder 306 is verified. If the content remains unchanged, the procedure ends. However, if the content is found to have changed, that means steps 402–404 have been repeated, then proceed to step 416. So, as mentioned previously, the driver detects that another frame of streaming data has to be transmitted and has written into the memory 104; in addition, the driver has already written the base address of said another data frame into the base recording unit 304 and triggered the digital controller 302. This triggering of the digital controller 302 is recorded in the trigger recorder 306 and results in a change in the content of the trigger recorder 306.

In step 416, the digital controller 302 begins to transmit said another data frame. That is, the digital controller 302 transmits said another data frame from memory 104 to signal processor 108 according to the memory address stored in the base recorder unit 304. Then, perform step 418 to determine whether another data frame has been transmitted. If not, repeat step 418; if so, repeat step 414.

As denoted by path A, with the completion of step 408, the driver repeatedly performs steps 402–408 while the digital controller 302 continues on to step 410 (path B). After step 412, the digital controller 302 cycles steps 414–418 repeatedly. It should be noted that the driver and the digital controller 302 perform their own relevant steps independently at the same time, that is to say, while the driver continuously performs the steps 402–408, the digital controller 302 continuously performs the steps 414–418. Whenever the driver reaches step 408, it triggers the digital controller 302 once. Meanwhile, if the digital controller 302 is not transmitting any streaming data, then the driver proceeds to step 410. However, if the digital controller 302 is transmitting data, then the above-mentioned triggering event is recorded in the trigger recorder 306. When the digital controller 302 reaches step 414, it will detect that the content of the trigger recorder 306 has changed and thus continue on to steps 416 and 418.

In the conventional method, while the digital controller 302 is transmitting data, the driver waits for the operating system for a next frame transmission of streaming data. If there are any streaming data for transmission, the driver must wait until the digital controller 302 has completed its current transmission, and an interrupt should be sent to the driver before it triggers the digital controller 302 for the next frame transmission intermission. In this way, intermission of the data stream will occur unless the digital controller 302 has sufficient FIFO buffers therein which entails a significant increase of logic gates. In contrast, according to the present invention, once the driver detects that there are streaming data to be transmitted, it immediately triggers the digital controller 302 without waiting for an interrupt from the digital controller 302. Then, the driver immediately writes the streaming data into the memory 104 and the address of the streaming data into the base recording unit 304, and updates the content of the trigger recorder 306. Therefor, when the digital controller 302 completes a transmission of a previous streaming data and detects that the content of the trigger recorder 306 has been changed, a next streaming data are immediately transmitted. In this way, the streaming data can be real-time transmitted without intermission.

Figure 5:
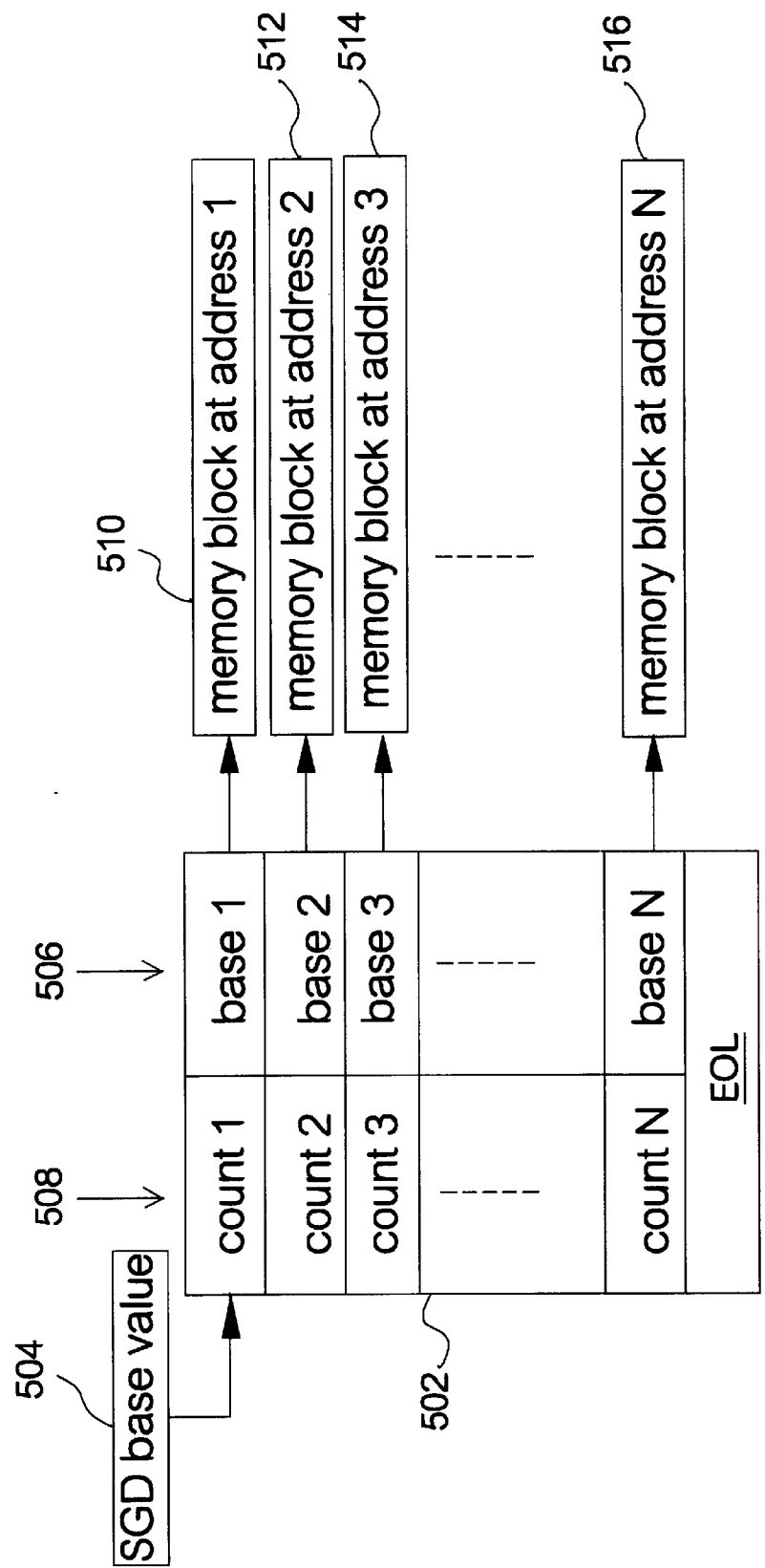
FIG. 5 illustrates a schematic diagram for a scatter gather description table in a memory.

There are various formats in the memory for the streaming data to be transmitted. For example, a scatter-gather description (SGD) table can be used for storing the streaming data in the memory FIG. 5 shows a schematic diagram of a SGD table in a memory. A SGD base value indicates the initial address of the SGD table 502 in the memory 104. The SGD table comprises N entries and each entry has two fields, a base field 506 and a count field 508. The base value in each base fields 1-N 506 represents an address corresponding to the initial address of individual data frame stored in the memory, wherein base 1, base 2, . . . m and base N point to a memory block 510 at address 1, a memory block 512 at address 2, . . . , and a memory block 516 at address N of the memory 510 respectively. The count value in each count field 508 records the size of a corresponding data frame. The end of the SGD table 502 is an end of list (EOL) symbol.

When the digital controller 302 is ready to transmit data, it first reads the value in the base recording unit 304 to obtain the SGD base address. Base 1 of the base field 506 is then read for the address of the first data frame. Start transmitting the first data frame. Upon completion, base 2 of the base field 506 is then read to obtain the address of the second data frame for subsequent transmission. This process is repeated sequentially until the EOL is read.

The base recording unit 304 records an initial address and the trigger recorder 306 records each triggering of the digital controller 302 by the driver while the streaming data are stored in a SGD table format. Therefore, according to the embodiment, most requirements for isochronous streaming data can be satisfied.

Figure 6:
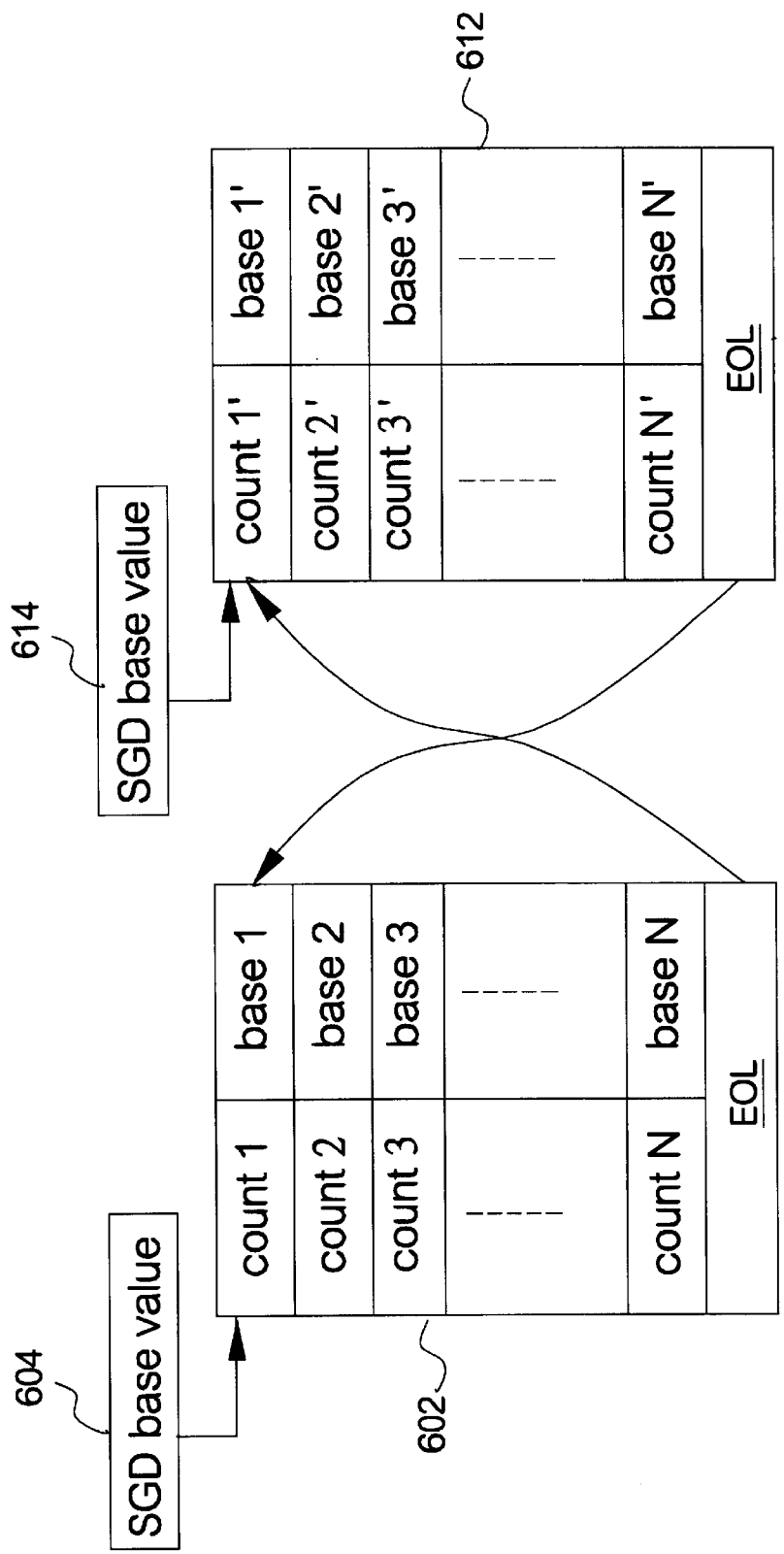
FIG. 6 illustrates a scatter gather description table while streaming data is transmitted.

FIG. 6 shows a SGD table for data transmission. When the first batch of streaming data is to be transmitted, the driver writes it into the memory 104 in a SGD table format, as well as the SGD base value 604 into the base recording unit 304. The driver then triggers the digital controller 302 to read the SGD base value 604 from the base recording unit 304. The data recorded in the SGD table are then transmitted to the signal processor 108 until the EOL is read. If the driver detects that there is a second batch of streaming data to be transmitted, it is stored in SGD table 612 in the memory 104 and the SGD base value 614 is stored in the base recording unit 304. The driver again triggers the digital controller 302, resulting in a change in the content of the trigger recorder 306. Once the digital controller 302 reads the EOL of the SGD table 602 and further detects that the content of the trigger recorder 306 is changed, the digital controller 302 then read the SGD base value 614 from the base recording unit 304 to begin transmitting the data recorded by SGD table 612. In this way, the data stream will be transmitted continuously without interrupt.

The base recording unit 304 can be a plurality of registers for storing M addresses, and the trigger recorder 306 can be a counter capable of counting up to M. When the driver detects that there are streaming data to be transmitted, the driver writes the streaming data into the base recording unit 304 in turn regardless of whether the digital controller 302 is transmitting data or not. The digital controller 302 is then triggered in turn so as to update the content of the trigger recorder 306. The digital controller 302 sequentially transmits the corresponding data according to the addresses in the base recording unit 304. As a result, M data frames can be real-time transmitted without intermissions.

The present invention is also suitable for transmitting data by using an universal serial bus (USB) to solve intermission problem. In addition, a FTFO buffer can be utilized in the digital controller simultaneously.

In summary, according to the present invention, the digital controller is directly triggered by the driver so as to update the content of the trigger recorder. The digital controller detects whether the content of the trigger recorder is changed. Namely, the driver can trigger the digital controller to real-time transmit data without waiting for an interrupt signal from the digital controller. Therefore, the method of the present invention performs much better than the conventional FIFO buffer and reduces logic gates. In addition, according to the present invention, the driver real-time writes data into the memory while the digital controller transmits data, thus saves software and hardware resource. The device disclosed by the present invention is very stable and easily maintained. The present invention is not limited to be used for the transmission of isochronous streaming data but also for non-isochronous streaming data, such as a general text file.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for solving intermission of streaming data, using a digital controller with a base recording unit and a trigger recorder to transmit streaming data stored in a storage unit, the method comprising steps of:
    (a) writing an initial address of a streaming data to the base recording unit when the streaming data is being transmitted;
    (b) changing a content value of the trigger recorder, and proceeding to the step (a) and a step (c) simultaneously;
    (c) transmitting a corresponding streaming data according to one of the initial address(es) stored in the base recording unit by the digital controller; and
    (d) proceeding to the step (c) when the trigger recorder indicates that there are data remained to be transmitted.

2. The method of claim 1, wherein in the step (a), the method ends when no streaming data is to be transmitted and the content of the trigger recorder indicates that no data remains to be transmitted.

3. The method of claim 1, wherein the storage unit is a memory.

4. The method of claim 3, wherein the streaming data is stored in the memory with a scatter-gather description (SGD) table format.

5. The method of claim 1, wherein the streaming data is transmitted to a signal processor.

6. The method of claim 1, wherein the trigger recorder is a flip-flop.

7. The method of claim 1, wherein the trigger recorder is a counter counting to an integral M.

8. The method of claim 1, wherein the base recording unit is a register.

9. The method of claim 1, wherein the streaming data are isochronous.

10. A method for solving intermission of streaming data, using a digital controller with a base recording unit and a trigger recorder to transmit streaming data stored in a storage unit, the method comprising steps of:
    (a) writing an initial address of a batch of streaming data to the base recording unit when said batch of streaming data is being transmitted;
    (b) changing a content value of the trigger recorder, and proceeding to the step (a) and a step (c) simultaneously;
    (c) when the trigger recorder indicates that there are data remained to be transmitted, transmitting a corresponding batch of streaming data according to one of the initial address(es) stored in the base recording unit by the digital controller; and (d) proceeding to the step (c) when the trigger recorder indicates that there are data remained to be transmitted.

11. The method of claim 10, wherein the streaming data is stored in the storage unit with a scatter-gather description (SGD) table format.

12. A device without intermission for streaming data, comprising:

a digital controller for transmitting the streaming data stored in a storage unit, comprising:
a base recording unit for recording an initial address of the streaming data to be transmitted; and
a trigger recorder for recording each triggering of the digital controller, wherein the trigger recorder indicates that there are data remained to be transmitted; and
whenever the trigger recorder indicates that there are data remained to be transmitted, a corresponding streaming data in the storage unit according to one of the initial address(es) stored in the base recording unit is transmitted by the digital controller.

13. The device of claim 12, wherein the streaming data is stored in the storage unit with a scatter-gather description (SGD) table format.

14. The device of claim 12, wherein the trigger recorder is a flip-flop.

15. The device of claim 12, wherein the streaming data is isochronous.

* * * * *